3,082,482
PROCESS FOR THE MANUFACTURE OF HOLLOW-WARE ARTICLES COMPOSED OF THERMO-PLASTIC MATERIAL
Thomas N. Gaunt, 179 Wetherby Road, Shadwell, Leeds 17, England
No Drawing. Filed Oct. 23, 1959, Ser. No. 848,234
1 Claim. (Cl. 18—48)

The invention relates to the manufacture of hollow-ware containers composed of thermoplastic material.

Some methods of manufacturing such containers and the like employ a moulding process one of which is known as suction moulding. With suction moulding there is a limit to the size and depth to which a container or the like can be moulded and the object of the present invention is to provide a new or improved process which makes possible the moulding of containers and hollow-ware of greatly increased depth without adversely affecting the strength of the moulded articles.

It has previously been proposed to increase the toughness of sheet polystyrene and similar materials by bi-axial stretching thereof during the course of extension. On heating such treated materials they tend to contract to their original dimensions and the original or inherent brittleness of the materials is again present. Consequently, such sheets have been very difficult to use in vacuum forming processes, particularly for deep drawing.

According to the present invention a clamped sheet of thermoplastic material such as polystyrene is stretched to increase its area during or immediately after heating, the stretched sheet being subsequently forced into a negative or intaglio mould by means of a positive or cameo plug or like member, vacuum being applied at the base and/or sides of the negative mould. The moulded area is then severed from the clamped sheet and removed from the mould.

Alternatively, a heated stretched sheet of thermoplastic material such as polystyrene may be sucked directly on to a positive mould or into a negative mould by constructing the moulds accordingly.

The sheet material at the time of moulding or forming must be bi-axially stretched in all directions to obtain maximum toughness and absence of grain.

By providing sets of rollers and arranging that the sets be driven at differential speeds, heated sheets of thermoplastic material may be longitudinally stretched.

The treated sheet may then be offered to a vacuum forming or moulding machine and to enable the sheet to be laterally stretched, the rear edge of the longitudinally stretched sheet is secured in a relatively stationary clamp, the opposite or front edge being secured in a clamp capable of being moved away from the stationary clamp, the sides of the sheet being supported by appropriate means.

When the sheet of material has been sufficiently laterally stretched the positive and negative moulds of the vacuum forming machine are caused to operate in the usual manner to shape or form a container or the like.

During moulding of an article a vacuum is created in the negative mould. This may be achieved by providing perforations in the bottom and/or sides of the negative mould and connecting thereto an air pump or other suitable means.

Instead of employing moulding machines incorporating positive and negative members a sheet of thermoplastic material—stretched as already described—may be sucked directly on to a positive mould or into a negative mould by appropriate means.

Should it be found to be an advantage in certain circumstances the afore-mentioned clamps may be cooled by providing them with water jackets. Alternatively, the clamps may be air-cooled.

By the heretofore described process it is possible to obtain tough thin-wall containers of excellent transparency and non-toxicity by using unmodified polystyrene or acrylonitrile-styrene co-polymer.

I claim:

In a process for the manufacture of transparent, thermoplastic, hollow-ware articles of improved toughness and strength consisting of heating a sheet of thermoplastic material selected from the group consisting of polystyrene and acrylonitrile styrene copolymer, stretching said heated sheet before it has cooled from said initial heat-treatment, and molding said stretched sheet into the shape of a hollow-ware article, that improvement consisting of the steps of stretching said sheet longitudinally and laterally while clamping opposed edges with co-acting, artificially-cooled clamps gripping said edges and driven apart to provide lateral stretching and simultaneously contacting said sheet with sets of rollers driven at different speeds between said opposed cooled clamps to longitudinally stretch said sheet before cooling to increase its area, thereafter vacuum molding said stretched sheet as soon as it has been stretched by clamping to the top surface of a mold in the shape of a hollow-ware article, said stretch sheet being clamped while simultaneously applying vacuum at the base and sides of the mold to thereby vacuum form the stretched sheet, cutting the non-vacuum-formed projecting edges of the sheet and removing the shaped article from the mold.

References Cited in the file of this patent

UNITED STATES PATENTS

| | | |
|---|---|---|
| 2,412,187 | Wiley et al. | Dec. 3, 1946 |
| 2,490,781 | Cloud | Dec. 13, 1949 |
| 2,728,941 | Alles et al. | Jan. 3, 1956 |
| 2,759,217 | Peterson | Aug. 21, 1956 |
| 2,784,457 | Dunmire | Mar. 12, 1957 |
| 2,918,696 | Bottoms et al. | Dec. 29, 1959 |
| 2,973,558 | Stratton | Mar. 7, 1961 |